United States Patent
Algard et al.

(10) Patent No.: US 10,122,851 B2
(45) Date of Patent: Nov. 6, 2018

(54) OUT-OF-BAND CALL VERIFICATION

(71) Applicant: Hiya, Inc., Seattle, WA (US)

(72) Inventors: Alexander Klas Algard, London (GB); Jonathan Orvin Nelson, Seattle, WA (US)

(73) Assignee: Hiya, Inc., Seattle, WA (US)

( * ) Notice: Subject to any disclaimer, the term of this patent is extended or adjusted under 35 U.S.C. 154(b) by 0 days.

(21) Appl. No.: 15/847,749

(22) Filed: Dec. 19, 2017

(65) Prior Publication Data

US 2018/0176372 A1    Jun. 21, 2018

Related U.S. Application Data

(60) Provisional application No. 62/437,021, filed on Dec. 20, 2016.

(51) Int. Cl.
  *H04M 1/56*  (2006.01)
  *H04M 15/06*  (2006.01)
  (Continued)

(52) U.S. Cl.
  CPC ....... *H04M 3/436* (2013.01); *H04M 3/42042* (2013.01); *H04M 3/42102* (2013.01);
  (Continued)

(58) Field of Classification Search
  CPC ......... H04M 3/42068; H04M 3/42042; H04M 3/523; H04M 7/006; H04M 2203/60; H04M 2203/558; H04M 15/06; H04M 15/42; H04M 1/006; H04M 1/2535; H04M 1/72519; H04M 3/51; H04M 3/5166; G06F 21/31; G06F 21/6245; G06Q 20/0855; G06Q 20/12; G06Q 20/382; G06Q 20/322;
  (Continued)

(56) References Cited

U.S. PATENT DOCUMENTS 5,341,414 A    8/1994    Popke
6,324,271 B1   11/2001   Sawyer et al.
(Continued)

OTHER PUBLICATIONS

Brandom, R., "AT&T is Adding a Spam Filter for Phone Calls," The Verge, Dec. 20, 2016, 3 pages, [Online] [Retrieved on Jan. 3, 2018] Retrieved from the Internet<URL:http://www.theverge.com/2016/12/20/14028948/att-call-protect-spam-filter-fraud-caller>.
(Continued)

*Primary Examiner* — Binh Kien Tieu
(74) *Attorney, Agent, or Firm* — Fenwick & West LLP

(57) ABSTRACT

A caller verification server receives a verification request message from a calling party via a data network. The verification request is associated with a communication from the calling party to a called device placed via a telephone network. The telephone network is logically separate from the data network. Thus, the verification request message travelling over the data network is said to be "out-of-band" relative to the telephone network. Responsive to receipt of the verification request message, the caller verification server generates a verification message indicating that the associated communication is verified as being from the calling party. The caller verification server sends the verification message to the called device via the data network.

19 Claims, 6 Drawing Sheets

(51) Int. Cl.
*H04M 3/436* (2006.01)
*H04M 7/00* (2006.01)
*H04M 3/42* (2006.01)
*H04L 29/08* (2006.01)

(52) U.S. Cl.
CPC ....... *H04M 7/0021* (2013.01); *H04M 7/0027* (2013.01); *H04L 67/26* (2013.01); *H04M 3/42059* (2013.01); *H04M 2207/203* (2013.01)

(58) Field of Classification Search
CPC ............ G06Q 20/3821; G06Q 20/385; G06Q 20/1014; G06Q 20/425
USPC .................................................... 379/142.15
See application file for complete search history.

(56) References Cited

U.S. PATENT DOCUMENTS

| | | | |
|---|---|---|---|
| 8,214,649 B2* | 7/2012 | Wood | H04L 9/326 |
| | | | 455/3.03 |
| 8,626,137 B1 | 1/2014 | Devitt et al. | |
| 9,060,057 B1 | 6/2015 | Danis | |
| 9,241,013 B2 | 1/2016 | Chow et al. | |
| 9,325,839 B2* | 4/2016 | Bender | H04L 9/3215 |
| 9,774,731 B1 | 9/2017 | Haltom et al. | |
| 9,894,199 B1* | 2/2018 | Wiechman | H04M 3/42068 |
| 2003/0095639 A1 | 5/2003 | Vinson | |
| 2005/0182818 A1* | 8/2005 | Kawamoto | H04L 63/083 |
| | | | 709/204 |
| 2005/0201363 A1 | 9/2005 | Gilchrist et al. | |
| 2006/0233160 A1 | 10/2006 | Kawanishi et al. | |
| 2006/0253584 A1 | 11/2006 | Dixon et al. | |
| 2007/0201638 A1 | 8/2007 | Lalter et al. | |
| 2007/0248220 A1 | 10/2007 | Crandell et al. | |
| 2009/0254529 A1 | 10/2009 | Goldentouch | |
| 2011/0280160 A1 | 11/2011 | Yang | |
| 2015/0043724 A1* | 2/2015 | Farris | H04M 3/4365 |
| | | | 379/142.05 |

OTHER PUBLICATIONS

PCT International Search Report and Written Opinion, PCT Application No. PCT/US17/67429, Mar. 8, 2018, 23 pages.

* cited by examiner

OUT-OF-BAND CALL VERIFICATION

CROSS-REFERENCE TO RELATED APPLICATIONS

This application claims the benefit of U.S. Provisional Patent Application No. 62/437,021, filed Dec. 20, 2016, the disclosure of which is hereby incorporated by reference in its entirety.

BACKGROUND

1. Field of Art

The present invention generally relates to the field of telephony and specifically to verifying calls made from calling parties to called devices.

2. Background of the Invention

Nuisance telephone calls are a growing problem. Such calls include unsolicited calls from nuisance callers like telemarketers and fraudsters. Computer technology, such as "robocallers," allows the nuisance callers to place a high volume of calls. Moreover, centralized directory services make it easier for the nuisance callers to gather large amounts of telephone numbers. The combination of these two abilities allows nuisance callers to engage in mass calling campaigns. These unwanted calls interrupt and annoy the called party, and may also lead to fraud.

In addition, technical characteristics of the telephone network make it relatively easy for a caller to spoof the telephone number from which a call is reportedly placed. Some callers take advantage of this ability for legitimate purposes. For example, a call center run by a legitimate party in which multiple different people make outbound calls may spoof the calling telephone number so that all of its calls appear to originate from a single number. Malicious callers also take advantage of the ability to spoof calling numbers. For example, a fraudulent caller can spoof the number of a legitimate caller so that the call appears legitimate. The caller may then defraud the called party by impersonating the legitimate caller.

SUMMARY

The above and other issues are addressed by a method, computer system, and computer-readable storage medium for verifying that a network communication is legitimate. An embodiment of the method includes receiving a verification request message from a calling party via a data network. The verification request is associated with a communication from the calling party to a called device placed via a telephone network. The method further includes generating, responsive to receipt of the verification request message, a verification message indicating that the associated communication is verified as being from the calling party. The method also includes sending the verification message to the called device via the data network.

An embodiment of the computer system includes a computer processor for executing computer program instructions. The system also includes a non-transitory computer-readable storage medium storing computer program instructions executable by the processor. The instructions are executable to receive a verification request message from a calling party via a data network. The verification request is associated with a communication from the calling party to a called device placed via a telephone network. The instructions are further executable to generate, responsive to receipt of the verification request message, a verification message indicating that the associated communication is verified as being from the calling party. The instructions additionally send the verification message to the called device via the data network.

An embodiment of the non-transitory computer-readable storage medium stores executable computer program instructions. The instructions are executable to receive a verification request message from a calling party via a data network. The verification request is associated with a communication from the calling party to a called device placed via a telephone network. The instructions are further executable to generate, responsive to receipt of the verification request message, a verification message indicating that the associated communication is verified as being from the calling party. The instructions additionally send the verification message to the called device via the data network.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
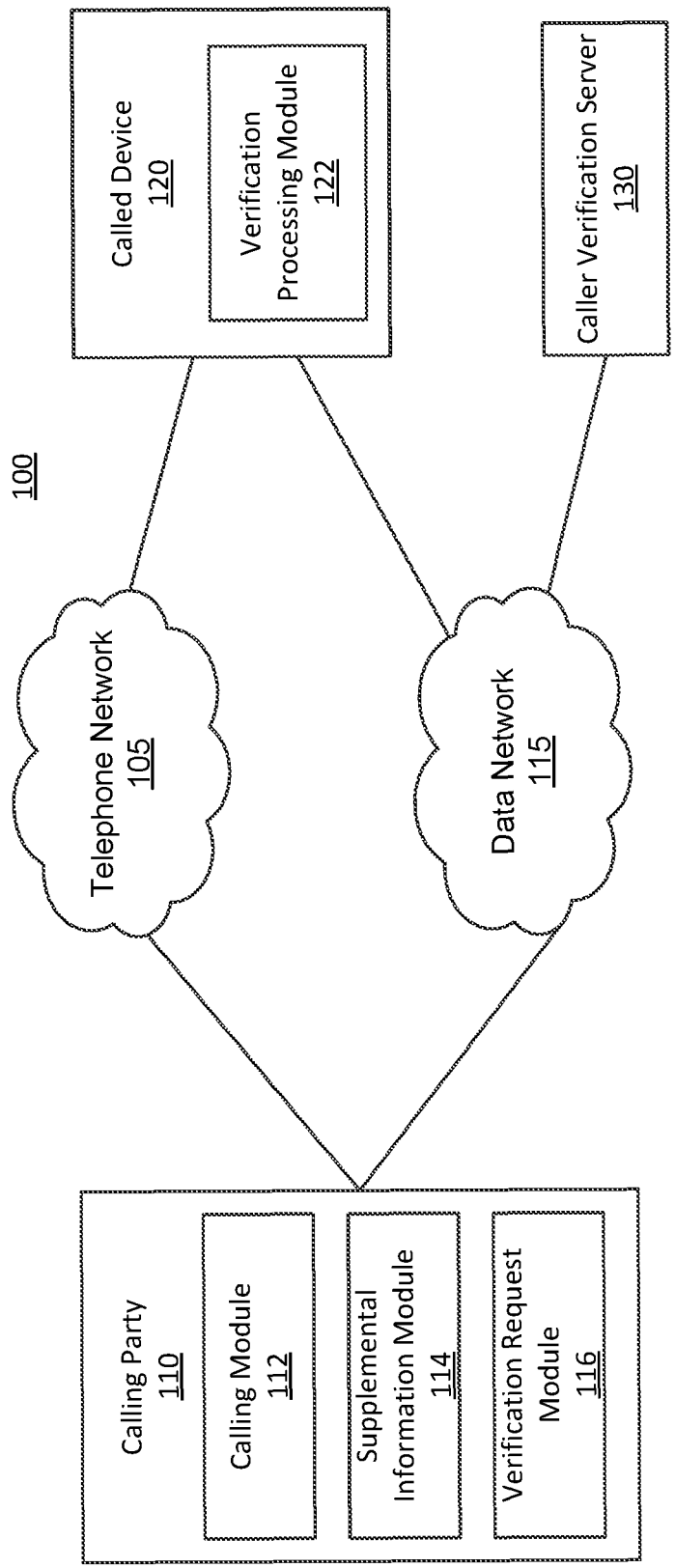
FIG. 1 is a high-level block diagram illustrating a computing environment for out-of-band call verification according to one embodiment.

FIG. 1 is a high-level block diagram illustrating a computing environment 100 for out-of-band call verification according to one embodiment. As shown, the computing environment 100 includes a calling party 110, a called device 120, and a caller verification server 130, which are connected via a telephone network 105 and a data network 115. Only one calling party 110, called device 120, and caller verification server 130 are illustrated in FIG. 1 for clarity. Embodiments of the computing environment 100 have many calling parties 110 and called devices 120, and may also have multiple caller verification servers 130. Likewise, the entities can be arranged in a different manner than displayed in FIG. 1.

The telephone network 105 enables electronic communication between the calling party 110 and the called device 120. In one embodiment, the telephone network 105 routes a communication, such as a telephone call or text message, from the calling party 110 to the called device 120. The telephone network 105 routes the communication using a called number provided by the calling party 110. In addition, the telephone network 105 identifies the calling party 110 using a calling number. The telephone network 105 may provide the calling number to the called device 120 in association with the communication. In addition, the telephone network 105 may provide additional information, such as a 15-character string describing the communication, via the Caller ID Name (CNAM) service.

In one embodiment, the telephone network 105 uses standard communication technologies and/or protocols. For example, the telephone network 105 may be the public switched telephone network (PSTN). The network protocols used on the telephone network 105 can include Common Channel Signaling System 7 (CCSS7), SIGTRAN, the Session Initiation Protocol (SIP), etc. The telephone network 105 may also include cellular or other forms of networks supporting mobile telephones using attendant protocols, such as the Long Term Evolution (LTE) protocol.

The data network 115 enables electronic communication between the calling party 110, called device 120, and caller verification server 130. In one embodiment, the data network 115 is the Internet. The data network 115 supports standard Internet communications protocols such as the Transmission Control Protocol/Internet Protocol (TCP/IP). The data network 115 and telephone network 105 may share communication paths. However, the data network 115 is logically separate from the telephone network 105 and may use different communication paths and protocols. A message sent over the data network 115 is said to be "out-of-band" relative to the telephone network 105 because the message is travelling over a logically-separate network. In one embodiment, the telephone network 105 and the data network 115 operate at approximately the same speed. That is, a communication placed over the telephone network 105 and a communication placed over the data network 115 both take approximately the same amount of time to transit from the source to the destination.

The calling party 110 is a telephone or another electronic device with telephone-like functionality that allows one or more callers to place calls. For example, the calling party 110 can be an individual landline or mobile telephone used by a single person to place calls. The calling party 110 can also be computer operating call platform software that allows multiple people to place calls simultaneously, such as software operated by a telemarketer. The calling party 110 from which a call is placed has an associated calling number. The calling number may be fixed, so that all calls from the calling party 110 have the same calling number. The calling number may be dynamic, so that different calls from the calling party 110 have different calling numbers. For example, calls from a call center may originate from a same calling number associated with the telemarketer. A call originating from the calling party 110 also has an associated called number. The called number identifies the party to whom the call is placed.

As shown in FIG. 1, the calling party 110 includes a calling module 112, a supplemental information module 114, and a verification request module 116. Some embodiments have additional and/or different modules. The functions ascribed to the modules may be distributed among the modules in a different manner than described herein.

The calling module 112 places communications to the called device 120 via the telephone network 105. For example, the calling module 112 may place a telephone call to the called device 120. The calling module 112 specifies the called device 120 using a called number. In addition, the calling module 112 identifies the calling party 110 using a calling number. The calling module 112 can associate different calling numbers with different placed communications. The calling module 112 may place communications on-demand and/or on a schedule.

The supplemental information module 114 associates supplemental information with communications placed by the calling module 112. The supplemental information includes information about the calling party 110 and information about a communication placed by the calling party via the telephone network 105. The supplemental information may include the name, address, image, business hours, and contact information for the calling party 110. The contact information for the calling party 110 may include the physical and/or Internet addresses of the calling party, one or more contact telephone numbers different than the calling number, etc. The supplemental information about a communication may include the date/time that a communication was, or will be, placed, estimated duration of the communication, type of the communication (e.g., a telephone call or a text message), calling and called numbers for the communication, and the purpose of the communication. The date/time that the communication was or will be placed can be specified within a range of dates or times. The supplemental information may further include information about the called device 120 or a user of the called device 120 and/or a message for the user of the called device 120.

The supplemental information module 114 generates the supplemental information and/or retrieves the information from a database or another source. For example, the supplemental information module 114 may communicate with the calling module 112 to detect when a communication has been or will be placed and obtain supplemental information particular to the communication, such as the time/date of the communication, the calling number, and the called number. The supplemental information module 114 may access a database to obtain information describing the purpose of the communication and describing the called device 120.

The verification request module 116 sends verification request messages to the caller verification server 130 via the data network 115. A verification request message requests that the caller verification server 130 verifies to the called device 120 that a communication placed by the calling party 110 is legitimate (i.e., was in fact placed by the calling party to the called device). The verification request message is sent out-of-band from the communication made by the calling module 112 because the request message travels over the data network 115 rather than the telephone network 105. The verification request module 116 includes at least some of the supplemental information about the communication to the caller verification server 130 within the verification request message.

The verification request module 116 interacts with the calling module 112 and supplemental information modules 114 to identify placed communications and associated supplemental information. The verification request module 116 sends a verification request message for each, or a subset, of the communications placed by the calling module 112. In one embodiment, the verification request module 116 sends a verification request message for a particular communication contemporaneously with when the calling module 112 places the communication. The verification request module 116 thus sends verification request messages on an ongoing basis, as communications are placed by the calling module 112. The verification request module 116 may also send verification request messages before the calling module 112 places the communications. For example, the verification request module 116 may send a verification request message that identifies multiple communications that will be placed by the calling module 112 in the future, along with associated supplemental information.

The caller verification server 130 notifies called devices 120 of whether communications received by the devices are from verified calling parties 110. The caller verification server 130 receives verification request messages from a calling party 110 via the data network 115. The caller verification server 130 obtains the supplemental information from the messages and uses the supplemental information to identify communications placed, or that will be placed, by the calling party 110 to called devices 120. The caller verification server 130 communicates with called devices 120 via the data network 115 to verify to the called devices 120 that communications received by the devices are legitimate. That is, the caller verification server 130 uses the supplemental information to verify to a called device 120 that a communication received by the called device 120 via the telephone network 105 is legitimate, i.e., that the communication was placed by the calling party 110 that purports to have placed the communication. The caller verification server 130 may also provide some or all of the supplemental information to the called device 120.

The called device 120 is a telephone or other electronic device with telephone-like functionality that allows a called party to receive a call or other communication placed by the calling party 110. The called device 120 can be an individual landline or mobile telephone. The called device 120 can also be a computer executing software that allows the computer to receive communications via the telephone network 105. The called device 120 has an associated called number. Communications sent to the associated called number via the telephone network 105 are received by the called device 120. Although this description refers to the device as the "called device" 120, the device may also have functionality allowing it to place communications to other devices. In addition, the called device 120 is in communication with the data network 115.

The called device 120 includes a verification processing module 122 which verifies that communications received by the called device 120 are legitimate. The verification processing module 122 may be an application executing on the called device 120. Alternatively, the verification processing module 122 may be part of an operating system executing on the called device 120. In one embodiment, the verification processing module 122 detects when a communication, such as a call, is received by the called device 120 via the telephone network 105. The verification processing module 122 communicates with the caller verification server 130 via the data network 115 to determine whether the received communication is legitimate. For example, the verification processing module 122 may determine the calling number associated with a received communication and query the caller verification server 130 to determine whether the communication is legitimate (i.e., the communication is really from the calling party associated with the calling number). In another example, the verification processing module 122 may receive a message from the caller verification server 130 via the data network 115 contemporaneously with when the communication is received via the telephone network 105, and use the message to verify that the communication is legitimate. The verification processing module 122 reports the result of the verification, i.e., whether the communication is legitimate, to the user of the called device 120.

The computing environment 100 described above thus provides security on the telephone network 105 by allowing users of called devices 120 to discriminate between calls that are verified as legitimate and other types of calls. A call from a malicious caller who is using technical characteristics of the telephone network 105 to spoof a legitimate calling number for a communication will fail verification. A user can use the verification, or lack thereof, as guidance as to whether to respond to a communication (e.g., answer a call) and/or to guide the sort of information that the user discloses as part of a communication. For example, a user may choose to disclose confidential information in response to a verified communication and withhold such information in response to non-verified communications. Accordingly, the computing environment 100 overcomes the technical security weakness in the telephone network 105 that allows calling parties 110 to spoof calling numbers.

Figure 2:
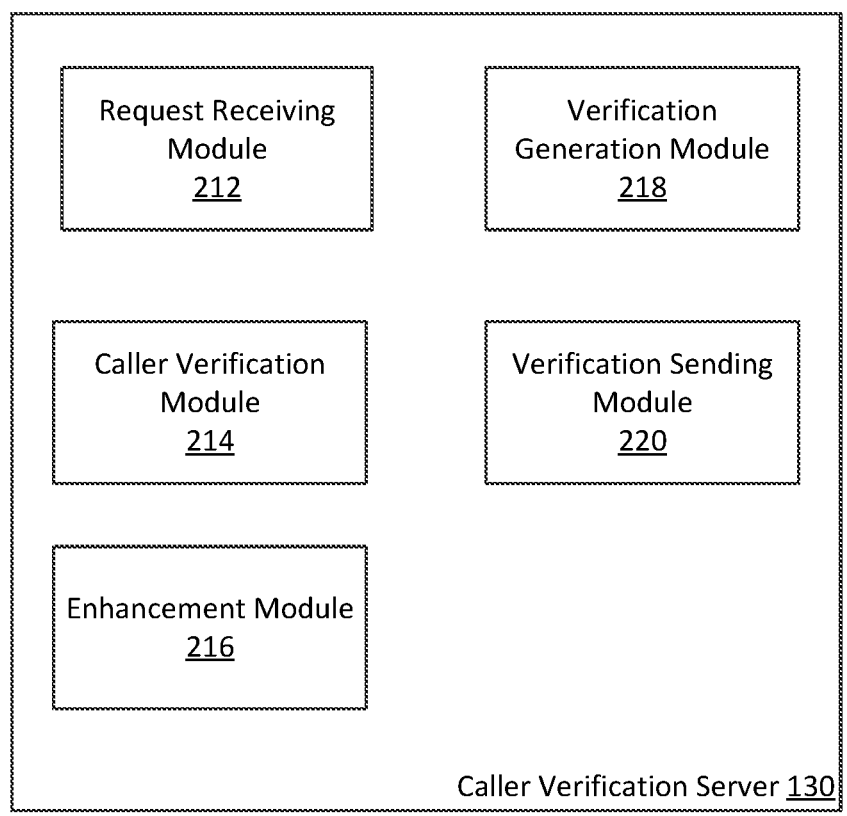
FIG. 2 is a high-level block diagram illustrating a detailed view of the caller verification server of FIG. 1 according to one embodiment.

FIG. 2 is a high-level block diagram illustrating a detailed view of the caller verification server 130 in FIG. 1 according to one embodiment. As shown in FIG. 2, the caller verification server 130 includes multiple modules. In some embodiments, the functions are distributed among the modules in a different manner than described herein. Moreover, the functions are performed by other entities in some embodiments.

The request receiving module 212 receives verification request messages from calling parties 110 via the data network 115. In one embodiment, the request receiving module 212 provides a secure application program interface (API) and receives verification request messages from only authorized and identified calling parties 110. The request receiving module 212 further parses the verification request messages to obtain the supplemental information contained therein.

A caller verification module 214 analyzes the supplemental information received in the verification request messages to identify verified communications placed by the calling parties 110. Recall that the supplemental information includes information about calling parties and information about communications placed by the calling party on the telephone network 105. For a given verification request, the caller verification module 214 identifies the calling party 110 and the called device 120. In addition, the caller verification module 214 identifies the associated communication on the telephone network 105 and when the communication has been or will be placed. The communication may be placed contemporaneously with when the request receiving module 212 receives the verification request message, or the communication may be scheduled in the future.

The enhancement module 216 enhances the supplemental information received in the verification request messages to produce enhanced information. In one embodiment, the enhancement module 216 receives the supplemental information from the calling party 110 and uses the supplemental information to obtain additional information. The enhancement module 216 combines the additional information with the supplemental information to produce the enhanced information. The enhancement module 216 may obtain the additional information from a local database, from the data network 115 (e.g., from Internet web sites), or from other sources. For example, the supplemental information may include the name of the calling party 110 but not certain other information about the calling party, such as an image or business hours. The enhancement module 216 uses the name of the calling party 110 in the supplemental information to retrieve other information about the calling party from the data network 115, e.g., obtains an image and business hours associated with the calling party from a web site, and combines the name, image, and business hours to form enhanced information.

The verification generation module 218 generates verification messages including at least some of the supplemental information received in verification request messages and, optionally, enhanced information produced by the enhancement module 216. A verification message indicates that an associated communication placed via the telephone network 105 is verified as from a legitimate calling party 110. A verification message may also include additional information about the communication, such as information describing the purpose of the communication, an image associated with the calling party 110, and/or a sponsored message from the calling party 110. For example, a verification message may include the text string "Verified call from Bank ABC," indicating that a telephone call from a particular calling party 110 ("Bank ABC") is legitimately from the identified calling party 110. Another example of a verification message is "Verified call from Bank ABC about potentially fraudulent use of your credit card." This latter message identifies the verified calling party 110 and describes the purpose of the communication from that party.

The verification sending module 220 sends out-of-band verification messages to called devices 120 via the data network 115. The verification sending module 220 may use push and/or pull-based techniques to send the verification messages to the called devices 120. In an embodiment using a push technique, the verification sending module 220 uses the supplemental information received from a calling party 110 to identify when a communication is being placed by the calling party to a particular called device 120. Generally the communication is placed contemporaneously with when the caller verification server 130 receives the verification request message from the calling party 110, or at a scheduled time in the future. The verification sending module 220 sends the verification message created by the verification generation module 218 for the communication to the called device 120 either before or contemporaneously with when the communication is being placed by the calling party 110 to that called device 120.

In an embodiment using a pull technique, the verification sending module 220 receives requests for verification messages from called devices 120 via the data network 115 using a secure API. A request for a verification message identifies the called device 120 that made the request. The verification sending module 220 identifies any verification messages associated with the requesting called device 120 and sends all or a subset of these verification messages to the called device in response the request. The verification sending module 220 may send multiple verification messages for communications that are scheduled to be placed in the future to the called device 120 in response to the request. Alternatively, the verification sending module 220 may send a single verification message for a communication that was placed, or scheduled to be placed, contemporaneously with when the verification sending module 220 receives the request from the called device 120.

Further, the request for a verification message from a called device 120 may include information about a communication received by the called device via the telephone network 105, such as the calling number and/or CNAM information. In this case, the verification sending module 220 uses the information to determine whether there is a verification message associated with the communication and sends that message in response to the request. The verification sending module 220 may further determine whether the verification message indicates that a communication was placed from the calling number to the called number contemporaneously with when the request is received from the called device 120, and send the verification only if this is the case. If there are no verification messages for the called device 120, either in general or for a communication at the time of the request, the verification sending module 220 indicates this fact in response to the request.

Figure 3:
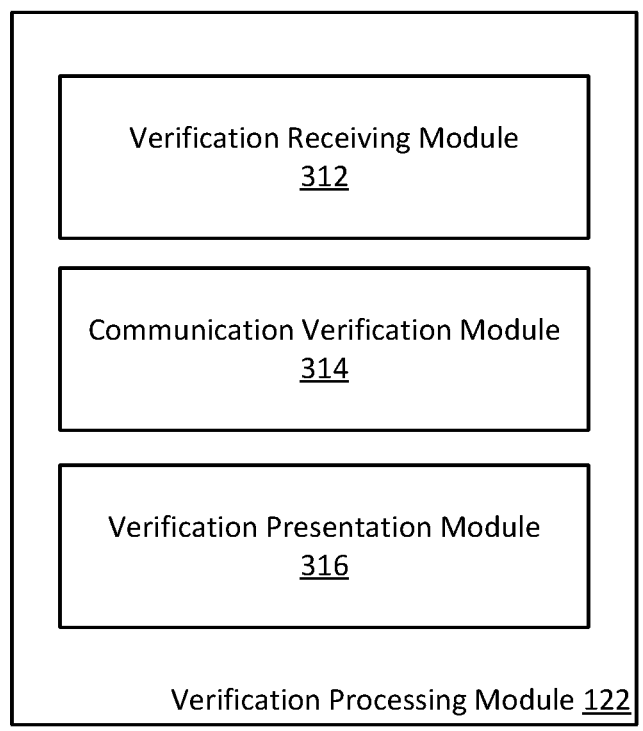
FIG. 3 is a high-level block diagram illustrating a detailed view of the verification processing module of a called device according to one embodiment.

FIG. 3 is a high-level block diagram illustrating a detailed view of the verification processing module 122 of a called device 120 according to one embodiment. As shown in FIG. 3, the verification processing module 122 includes multiple modules. In some embodiments, the functions are distributed among the modules in a different manner than described herein. Moreover, the functions are performed by other entities in some embodiments.

The verification receiving module 312 receives verification messages from the caller verification server 130 via the data network 115. Depending upon the embodiment, the verification receiving module 312 may receive verification messages pushed by the caller verification server 130, and/or the verification receiving module 312 may pull (i.e., request) messages from the caller verification server 130. In the push embodiment, the verification receiving module 312 provides a secure API by which it can receive verification messages from the caller verification server 130 at arbitrary times. Any such messages received via the API are forwarded to other modules within the verification processing module 122.

In the pull embodiment, the verification receiving module 312 uses the API provided by the caller verification server 130 to request any verification messages applicable to the called device 120. The verification receiving module 312 may make the request when the called device 120 receives a communication via the telephone network 105 and include information about the received communication, such as the calling number and/or CNAM information, in the request. The verification receiving module 312 may also make the request at other times. The verification receiving module 312 receives one or more verification messages, or an indication that there are no verification messages, for the called device 120 in response to the request.

The communication verification module 314 attempts to verify communications received via the telephone network 105 using the verification messages received via the data network 115. The communication verification module 314 identifies information about a received communication. This information may include the calling and called numbers for the communication, the CNAM string received with the communication, and the time and date that the communication was received. The communication verification module 314 attempts to correlate the information about the communication received via the telephone network 105 with supplemental information in a verification message. If the information about the communication correlates with the supplemental information, then the communication verification module 314 verifies the communication as legitimate. Otherwise, the communication verification module 314 does not verify the communication as legitimate.

The communication verification module 314 correlates the information about the received communication with supplemental information in a verification message by comparing equivalent data in the two sets of information to determine whether the data match. For example, the communication verification module 314 compares the calling number of a received communication with the calling number of a verification message. The communication verification module 314 verifies a communication as legitimate if at least a threshold amount of data matches. The threshold amount may vary. In one embodiment, a communication is verified as legitimate if at least the calling number matches. For example, in an embodiment where the called device 120 receives a verification message contemporaneously with when the called device 120 is expected to receive the corresponding communication via the telephone network 105, the communication verification module 314 may verify the communication if only the calling number matches. In contrast, if the caller device 120 receives multiple verification message in advance of when the called device is expected to receive the corresponding communications via the telephone network 105, the communication verification module 314 may verify the communication only if the calling number and the date/time that the communication will be placed match.

The verification presentation module 316 presents the result of the verification attempt performed by the communication verification module 314 to the user of the called device 120. In one embodiment, the verification presentation module 316 shows a message indicating whether a received communication is verified on a display of the called device 120. The message may say "VERIFIED CALLER" or "NOT VERIFIED" for example. The verification presentation module 316 may also present the result of the verification using other techniques, such as by presenting an image, an audio cue (e.g., a ringtone) and/or haptic feedback.

In addition, the verification presentation module 316 may present supplemental information and, optionally, enhanced information, from the associated verification message in association with a verified communication. For example, the verification presentation module 316 may present information about the calling party 110 and the purpose of the call, the expected duration of the call, and/or a message sponsored by the calling party.

Figure 4:
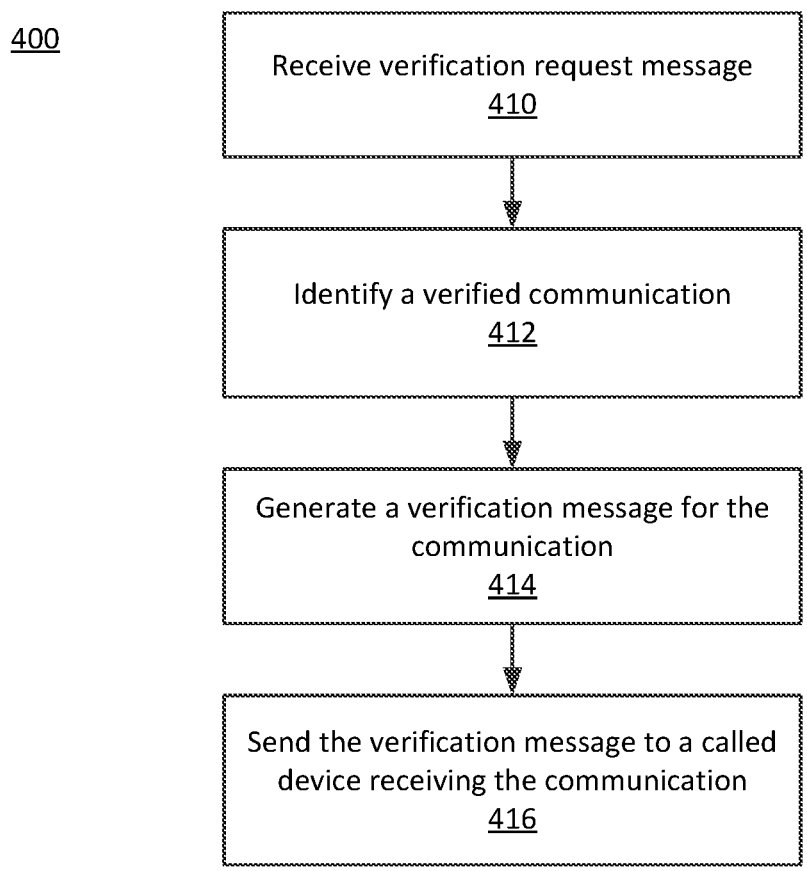
FIG. 4 is a flowchart illustrating a method for performing out-of-band call verification according to one embodiment.

FIG. 4 is a flowchart illustrating a method for performing out-of-band call verification according to one embodiment. In some embodiments, the method is performed by the caller verification server 130, although some or all of the operations in the method may be performed by other entities in other embodiments. In some embodiments, the operations in the flow chart are performed in a different order and can include different and/or additional steps.

The caller verification server 130 receives 410 a verification request message from a calling party 110. The verification request message requests that the caller verification server 130 verifies to a called device 120 that a communication placed by the calling party 110 to the called device 120 is legitimate. The verification request is sent out-of-band from the communication made by the calling module 112 because the request travels over the data network 115 rather than the telephone network 105. The caller verification server 130 identifies and analyzes supplemental information in the verification request message to identify 412 the verified communication. The caller verification server 130 generates 414 a verification message for the communication. The caller verification server 130 sends 416 the verification message to the called device 120 that is receiving the communication.

Figure 5:
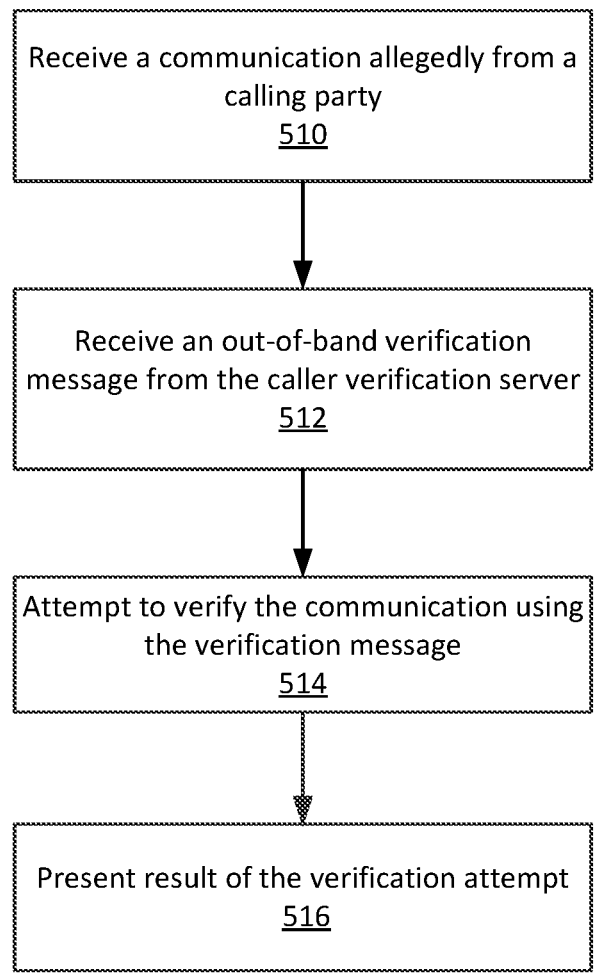
FIG. 5 is a flowchart illustrating a method for presenting a result of a verification attempt at a called device according to one embodiment.

FIG. 5 is a flowchart illustrating a method for presenting a result of a verification attempt at a called device 120 according to one embodiment. In some embodiments, the method is performed by the called device 120, although some or all of the operations in the method may be performed by other entities in other embodiments. In some embodiments, the operations in the flow chart are performed in a different order and can include different and/or additional steps.

The called device 120 receives 510 a communication allegedly from a calling party 110 via the telephone network 105. In addition, the called device 120 may receive 512 an out-of-band verification messages from the caller verification server 130. The verification message is received via the data network 115, out-of-band from the telephone network 105. The called device 120 may receive the verification message before receiving the communication or contemporaneously with receipt of the communication. The called device 120 also might not receive any verification messages.

The called device 120 attempts to verify 514 the communication using the verification message received from the caller verification server 130. The called device 120 verifies the communication by correlating information about the communication with supplemental information in the verification message. If the called device 120 did not receive a verification message, or it cannot correlate the information, then the called device does not verify the communication. The called device 120 then presents 516 result of the verification attempt to the user of the called device 120. The presentation may be a message indicating the result of the verification attempt, a sound such as a ringtone indicating the result of the verification attempt, or another type of presentation.

Figure 6:
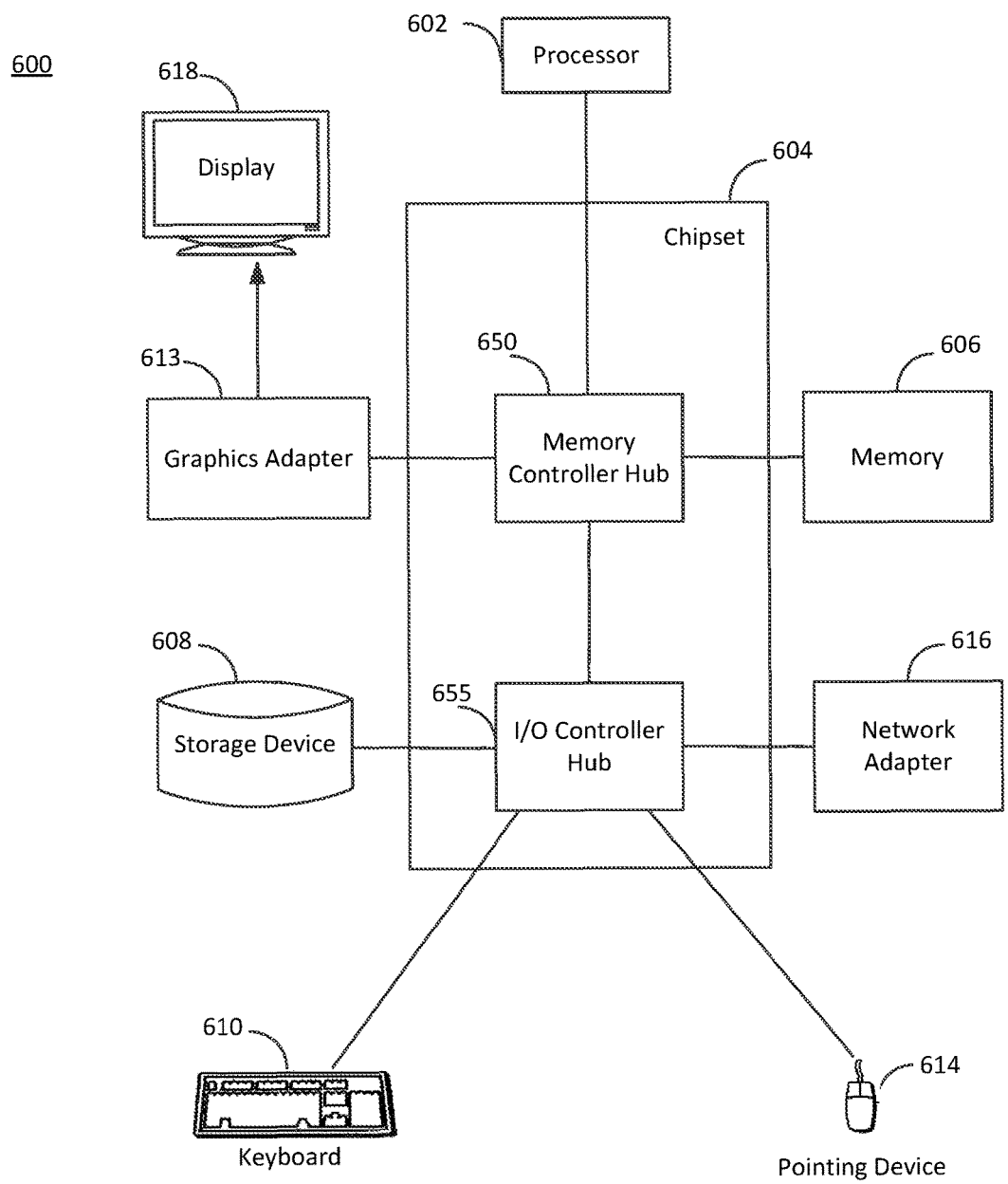
FIG. 6 is a high-level block diagram illustrating an example of a computer for use as one of the entities shown in FIG. 1 according to one embodiment.

FIG. 6 is a high-level block diagram illustrating an example of a computer for use as the calling party 110, called device 120, and/or caller verification server 130 according to one embodiment. Illustrated are at least one processor 602 coupled to a chipset 604. The chipset 604 includes a memory controller hub 650 and an input/output (I/O) controller hub 655. A memory 606 and a graphics adapter 613 are coupled to the memory controller hub 650, and a display device 618 is coupled to the graphics adapter 613. A storage device 608, keyboard 610, pointing device 614, and network adapter 616 may be coupled to the I/O controller hub 655. Other embodiments of the computer 600 have different architectures. For example, the memory 606 is directly coupled to the processor 602 in some embodiments.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is used in combination with the keyboard 610 to input data into the computer system 600. The graphics adapter 613 displays images and other information on the display device 618. In some embodiments, the display device 618 includes a touch screen capability for receiving user input and selections. The network adapter 616 couples the computer system 600 to a network, such as the telephone network 105 and/or the data network 115. Some embodiments of the computer 600 have different and/or other components than those shown in FIG. 6. For example, the caller verification server 130 can be formed of multiple blade servers and lack a display device, keyboard, and other components.

The computer 600 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

Upon reading this disclosure, those of skill in the art will appreciate that additional alternative structural and functional designs are possible. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of verifying that a network communication is legitimate, the method comprising:
   receiving a verification request message from a calling party via a data network, the verification request message associated with a scheduled future communication to be placed from the calling party to a called device via a telephone network;
   generating, responsive to receipt of the verification request message, a verification message indicating that the associated communication is verified as being from the calling party;
   receiving a request for the verification message from the called device via the data network;
   identifying the called device from which the request was received;
   identifying a set of verification messages associated with the identified called device, the set of verification messages comprising a plurality of verification messages including the generated verification message; and
   sending the identified set of verification messages to the called device via the data network in response to the received request.

2. The method of claim 1, further comprising:
   identifying supplemental information within the verification request message;
   analyzing supplemental information within the verification request message to identify the communication from the calling party to the called device associated with the message; and
   including at least some of the supplemental information within the verification request message within the verification message sent to the called device.

3. The method of claim 1, further comprising:
   identifying supplemental information within the verification request message; and
   analyzing the supplemental information to determine when the communication is being placed from the calling party to the called device;
   wherein the identified set of verification messages is sent to the called device via the data network prior to when the communication is being placed from the calling party to the called device.

4. The method of claim 1, wherein sending the identified set of verification messages to the called device via the data network comprises:
   analyzing supplemental information within the verification request message to determine when the communication is being placed from the calling party to the called device; and
   pushing the identified set of verification messages to the called device via the data network prior to when the communication is being placed from the calling party to the called device.

5. The method of claim 1, wherein receiving a verification request message from the calling party via the data network comprises:
   providing a secure application program interface (API) that accepts verification request messages from only authorized calling parties.

6. The method of claim 1, wherein the telephone network and the data network are logically separate.

7. The computer-implemented method of claim 1, wherein the request for the verification message is received from the called device before the communication is placed from the calling party to the called device.

8. The computer-implemented method of claim 1, wherein the plurality of verification messages are from different calling parties.

9. A non-transitory computer readable storage medium storing executable computer program instructions for verifying that a network communication is legitimate, the computer program instructions comprising instructions that when executed cause a computer processor to:
   receive a verification request message from a calling party via a data network, the verification request message associated with a scheduled future communication to be placed from the calling party to a called device via a telephone network;
   generate, responsive to receipt of the verification request message, a verification message indicating that the associated communication is verified as being from the calling party;
   receive a request for the verification message from the called device via the data network;
   identify the called device from which the request was received;
   identify a set of verification messages associated with the identified called device, the set of verification messages comprising a set of verification messages including the generated verification message; and
   send the identified set of verification messages to the called device via the data network in response to the received request.

10. The computer readable medium of claim 9, wherein the computer program instructions for verifying that a network communication is legitimate further comprise instructions that when executed cause the computer processor to:
    identify supplemental information within the verification request message;
    analyze supplemental information within the verification request message to identify the communication from the calling party to the called device associated with the message; and
    include at least some of the supplemental information within the verification request message within the verification message sent to the called device.

11. The computer readable medium of claim 9, wherein the computer program instructions for verifying that a network communication is legitimate further comprise instructions that when executed cause the computer processor to:
    identify supplemental information within the verification request message; and analyze the supplemental information to determine when the communication is being placed from the calling party to the called device;
wherein the identified set of verification messages is sent to the called device via the data network prior to when the communication is being placed from the calling party to the called device.

12. The computer readable medium of claim 9, wherein the computer program instructions for sending the identified set of verification messages to the called device via the data network comprise instructions that when executed cause the computer processor to:
analyze supplemental information within the verification request message to determine when the communication is being placed from the calling party to the called device; and
push the identified set of verification messages to the called device via the data network prior to when the communication is being placed from the calling party to the called device.

13. The computer readable medium of claim 9, wherein the computer program instructions for receiving a verification request message from the calling party via the data network comprise instructions that when executed cause the computer processor to:
provide a secure application program interface (API) that accepts verification request messages from only authorized calling parties.

14. The computer readable medium of claim 9, wherein the telephone network and the data network are logically separate.

15. A computer system for verifying that a network communication is legitimate, the system comprising:
receiving a verification request message from a calling party via a data network, the verification request message associated with a scheduled future communication to be placed from the calling party to a called device via a telephone network;
generating, responsive to receipt of the verification request message, a verification message indicating that the associated communication is verified as being from the calling party;
receiving a request for the verification message from the called device via the data network;
identifying the called device from which the request was received;
identifying a set of verification messages associated with the identified called device, the set of verification messages comprising a plurality of verification messages including the generated verification message; and
sending the identified set of verification messages to the called device via the data network in response to the received request.

16. The system of claim 15, further comprising:
identifying supplemental information within the verification request message;
analyzing supplemental information within the verification request message to identify the communication from the calling party to the called device associated with the message; and
including at least some of the supplemental information within the verification request message within the verification message sent to the called device.

17. The system of claim 15, further comprising:
identifying supplemental information within the verification request message; and
analyzing the supplemental information to determine when the communication is being placed from the calling party to the called device;
wherein the identified set of verification messages is sent to the called device via the data network prior to when the communication is being placed from the calling party to the called device.

18. The system of claim 15, wherein sending the identified set of verification messages to the called device via the data network comprises:
analyzing supplemental information within the verification request message to determine when the communication is being placed from the calling party to the called device; and
pushing the identified set of verification messages to the called device via the data network prior to when the communication is being placed from the calling party to the called device.

19. The system of claim 15, wherein the telephone network and the data network are logically separate.

* * * * *